US012683682B2

(12) United States Patent
Vinayachandran et al.

(10) Patent No.: US 12,683,682 B2
(45) Date of Patent: Jul. 14, 2026

(54) OPTICAL COMMUNICATION SYSTEM, OPTICAL COMMUNICATION METHOD AND NON-TRANSITORY COMPUTER READABLE MEDIUM

(71) Applicant: NEC Corporation, Tokyo (JP)

(72) Inventors: Ankith Vinayachandran, Tokyo (JP); Manabu Arikawa, Tokyo (JP); Kohei Hosokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 18/526,475

(22) Filed: Dec. 1, 2023

(65) Prior Publication Data

US 2024/0195498 A1 Jun. 13, 2024

(30) Foreign Application Priority Data

Dec. 7, 2022 (JP) ................................. 2022-195269

(51) Int. Cl.
*H04B 10/077* (2013.01)
*H04B 7/0413* (2017.01)

(52) U.S. Cl.
CPC ....... *H04B 10/0775* (2013.01); *H04B 7/0413* (2013.01)

(58) Field of Classification Search
None
See application file for complete search history.

(56) References Cited

U.S. PATENT DOCUMENTS

| | | | | |
|---|---|---|---|---|
| 7,505,685 B2 * | 3/2009 | Takanashi | ........... | H04J 14/0241 |
| | | | | 398/32 |
| 9,473,250 B2 * | 10/2016 | Koike-Akino | ........ | H04L 1/0055 |
| 9,559,785 B2 * | 1/2017 | Nakashima | ........ | H04B 10/6165 |
| 9,559,786 B2 | 1/2017 | Millar et al. | | |
| 9,660,762 B2 * | 5/2017 | Le Taillandier De Gabory | .......... | |
| | | | | H04B 10/2581 |
| 10,979,354 B2 * | 4/2021 | Zhang | ................. | H04L 27/2613 |
| 2017/0041078 A1 * | 2/2017 | Le | ...................... | H04B 10/6163 |

FOREIGN PATENT DOCUMENTS

JP        2019-092210 A        6/2019

OTHER PUBLICATIONS

Mazur et al., Overhead-optimization of pilot-based digital signal processing for flexible high spectral efficiency transmission, Optics Express, 2019 (Year: 2019).*
Medhi, Von Neumann Architecture, 2012 (Year: 2012).*
Malla Reddy College of Engineering & Technology, Machine Learning Lecture Notes, 2021 (Year: 2021).*
Mikael Mazur, Jochen Schroder, Abel Lorences-Riesgo, Tsuyoshi Yoshida, Magnus Karlsson, and Peter A. Andrekson, "Overhead-optimization of pilot-based digital signal processing for flexible high spectral efficiency transmission," Opt. Express 27, 24654-24669. Aug. 19, 2019.

* cited by examiner

*Primary Examiner* — Jai M Lee

(57) ABSTRACT

An optical communication system capable of solving frequent pilot pattern/training symbol requirement which leads to a reduced information throughput is provided. An optical communication system includes a pilot insertion means that inserts pilot signal according to an adaptive pilot overhead ratio, a system estimate means that estimates the characteristics of the equalized signal to access channel conditions, and a trigger pilot means that selects the appropriate pilot overhead ratio for the accessed channel conditions by various system mean.

11 Claims, 9 Drawing Sheets

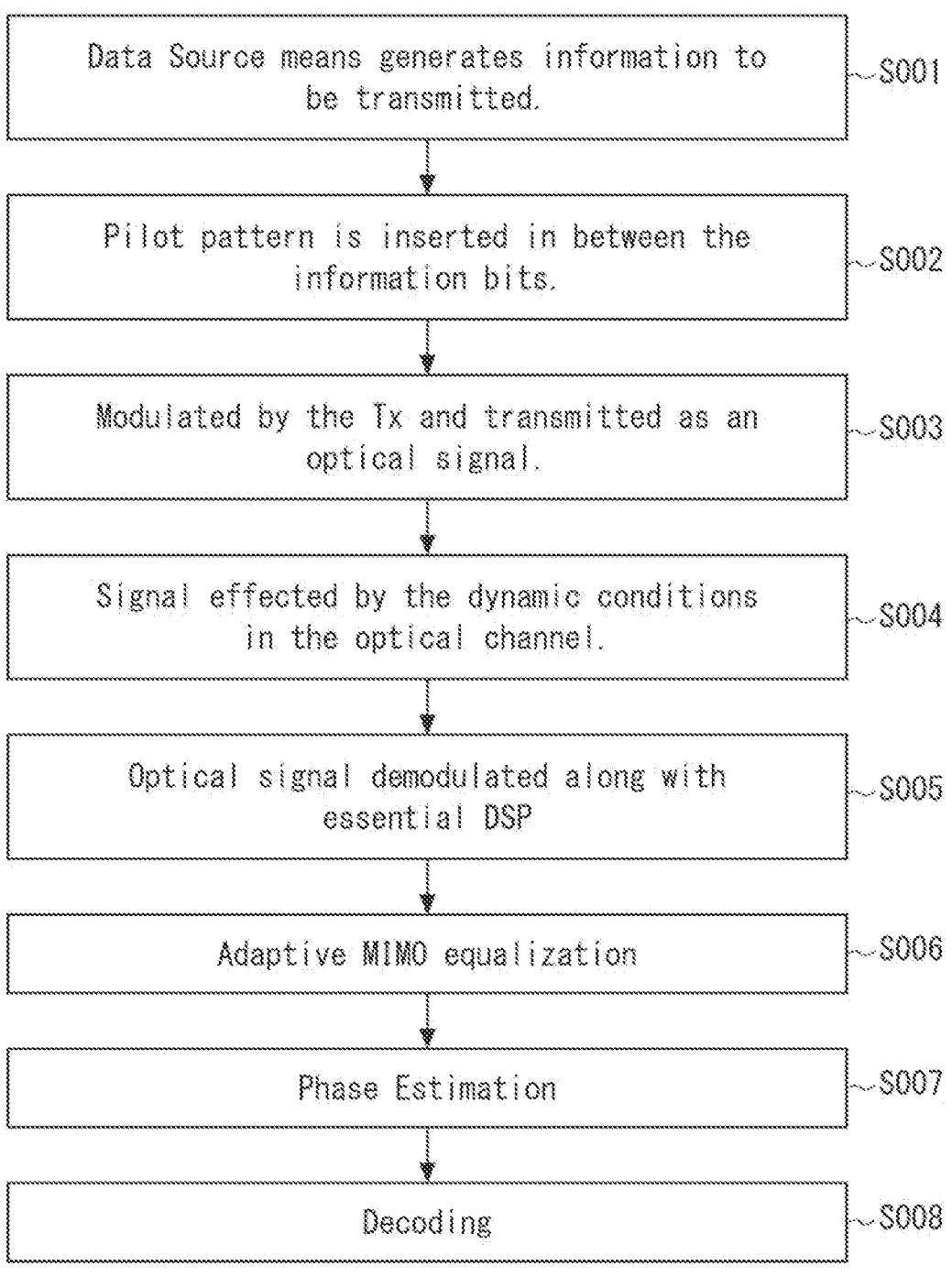

Data Source means generates information to be transmitted. ~S001

Pilot pattern is inserted in between the information bits. ~S002

Modulated by the Tx and transmitted as an optical signal. ~S003

Signal effected by the dynamic conditions in the optical channel. ~S004

Optical signal demodulated along with essential DSP ~S005

Adaptive MIMO equalization ~S006

Phase Estimation ~S007

Decoding ~S008

Fig. 2

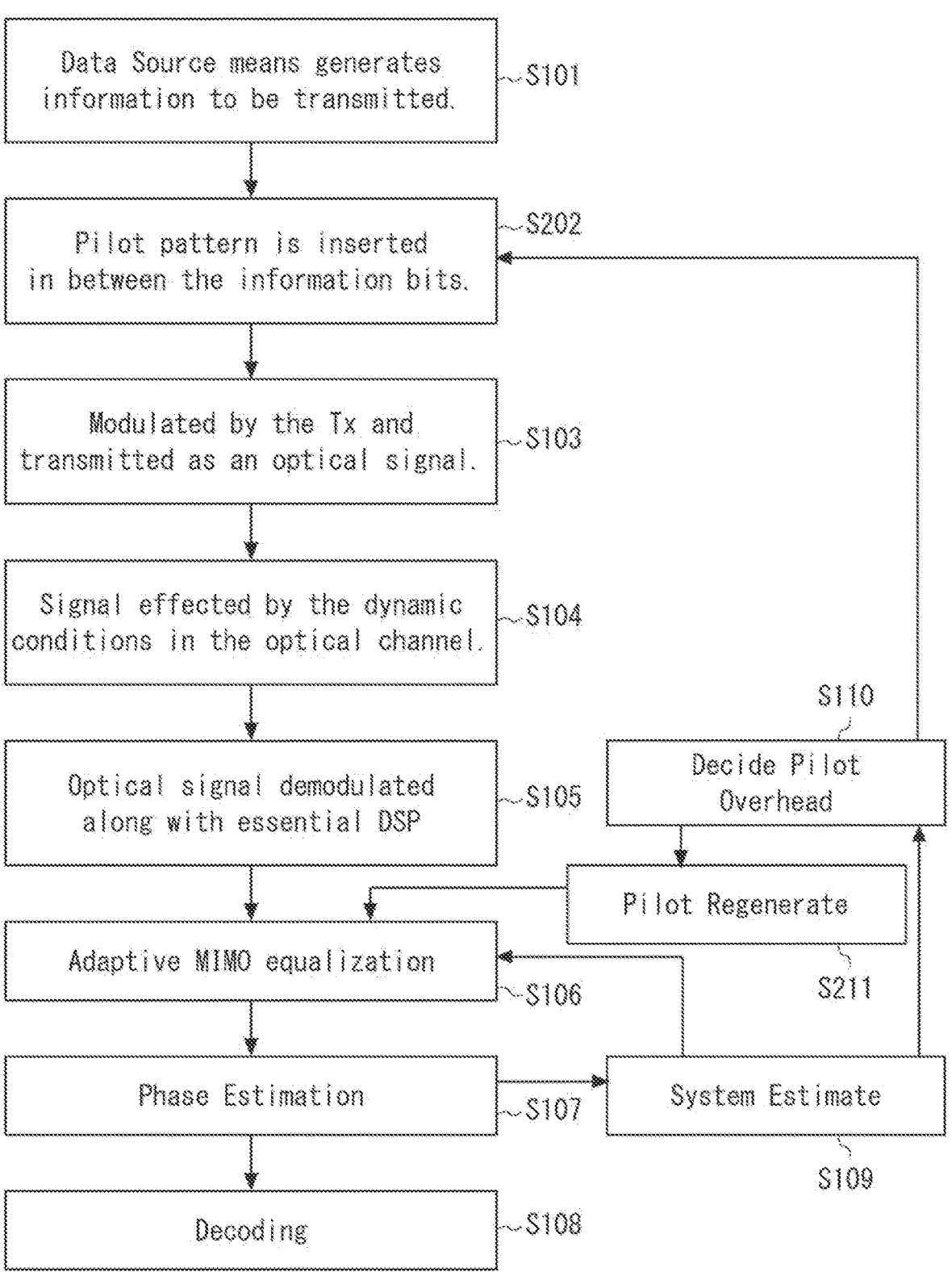

Data Source means generates information to be transmitted.　～S101

Pilot pattern is inserted in between the information bits.　～S202

Modulated by the Tx and transmitted as an optical signal.　～S103

Signal effected by the dynamic conditions in the optical channel.　～S104

Optical signal demodulated along with essential DSP　～S105

Adaptive MIMO equalization　～S106

Phase Estimation　～S107

Decoding　～S108

Decide Pilot Overhead　S110

Pilot Regenerate　S211

System Estimate　S109

Fig. 6

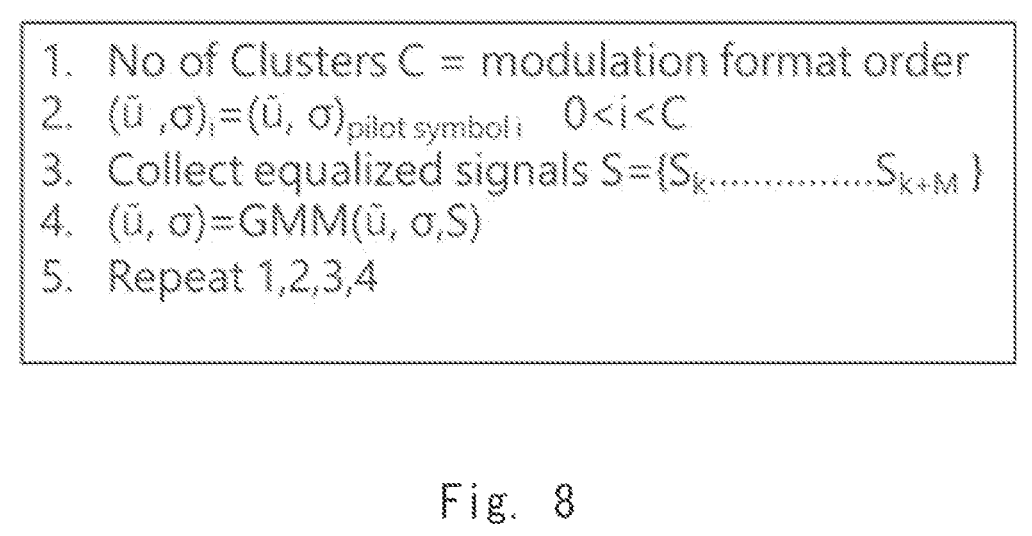

1. No of Clusters C = modulation format order
2. $(\bar{u}, \sigma)_i = (\bar{u}, \sigma)_{pilot\ symbol\ i}$   $0 < i < C$
3. Collect equalized signals $S = \{S_K \ldots \ldots \ldots S_{K+M}\}$
4. $(\bar{u}, \sigma) = GMM(\bar{u}, \sigma, S)$
5. Repeat 1,2,3,4

Fig. 8

OPTICAL COMMUNICATION SYSTEM, OPTICAL COMMUNICATION METHOD AND NON-TRANSITORY COMPUTER READABLE MEDIUM

INCORPORATION BY REFERENCE

This application is based upon and claims the benefit of priority from Japanese patent application No. 2022-195269, filed on Dec. 7, 2022, the disclosure of which is incorporated herein in its entirety by reference.

TECHNICAL FIELD

The present disclosure relates to an optical communication system, a method, a program, and a non-transitory computer readable storage medium.

BACKGROUND ART

U.S. Pat. No. 9,559,786B2 discloses a Pilot-aided coherent receiver for optical communications, which is an example of a related optical communication system with a training pattern based adaptive equalization. Japanese Unexamined Patent Application Publication No. 2019-092210 discloses "a device can adapt DMRS pilot density over time to facilitate earlier pilot processing and thereby improve the decoding timeline for channel estimation. And a device can use an adjustable traffic-to-pilot ratio (TPR) for throughput optimization."

NPL 1 discloses "Overhead-optimization of pilot-based digital signal processing for flexible high spectral efficiency transmission,". In NPL 1, the pilot overhead ratio may be adjusted in an offline state after considering received transmission metrics such as Achievable information rate.

NPL 1: Mikael Mazur, Jochen Schroder, Abel Lorences-Riesgo, Tsuyoshi Yoshida, Magnus Karlsson, and Peter A. Andrekson, "Overhead-optimization of pilot-based digital signal processing for flexible high spectral efficiency transmission," Opt. Express 27, 24654-24669 (2019)

SUMMARY

A first problem is that frequent pilot pattern/training symbol requirement may reduce information throughput. The first problem results from that frequent pilot pattern is required by the adaptive MIMO equalization mechanism to keep track of system dynamics and optimize signal recovery.

A second problem is that the fixed pilot overhead ratio is set in the system expecting the worst expected dynamic condition. The system may not always experience this worst dynamic condition so optimal operation may be possible with a lower pilot overhead ratio. The second problem results from the fixed pilot overhead used for a dynamically changing system condition.

Japanese Unexamined Patent Application Publication No. 2019-092210 describes a pilot control mechanism for wireless cellular communication. Since Japanese Unexamined Patent Application Publication No. 2019-092210 refers to a wireless communication system, a wireless receiver is used instead of an optical receiver. The adaptive equalizer is present even for the wireless system but the data from this block is not used for estimating the required pilot pattern in Japanese Unexamined Patent Application Publication No. 2019-092210.

An objective of the present disclosure is to provide a system that is capable of solving at least the first problem by setting the pilot overhead ratio adaptively so that system throughput is maximized.

Another objective of the present disclosure is to provide a system that is capable of solving the second problem by setting pilot overhead adaptively and optimally according to the dynamic channel conditions.

In the first example aspect of the present disclosure, an optical communication system for transmitting an optical signal from a transmitter via an optical channel to a receiver; the system includes:

a pilot insertion means for inserting training or pilot signals at a desired pilot overhead ratio in an online operation state;

a system estimate means for estimating and characterizing the signal recovered from the optical channel utilizing adaptive filter parameters and estimated noise characteristics in the signal; and, a trigger pilot means for utilizing information obtained from the estimated signal to determine channel conditions and fix the required pilot overhead ratio.

In the second example aspect of the present disclosure, an optical communication method for transmitting an optical signal from a transmitter via an optical channel to a receiver; the method includes:

inserting training or pilot signals at a desired pilot overhead ratio in an online operation state;

estimating and characterizing the signal recovered from the optical channel utilizing adaptive filter parameters and estimated noise characteristics in the signal; and, utilizing information obtained from the estimated signal to determine channel conditions and fix the required pilot overhead ratio.

In the third example aspect of the present disclosure, a program that causes a computer to execute an optical communication method for transmitting an optical signal from a transmitter via an optical channel to a receiver; the method includes:

inserting training or pilot signals at a desired pilot overhead ratio in an online operation state;

estimating and characterizing the signal recovered from the optical channel utilizing adaptive filter parameters and estimated noise characteristics in the signal; and, utilizing information obtained from the estimated signal to determine channel conditions and fix the required pilot overhead ratio.

A first effect is to ensure that the system throughput maximization for the system without reduction in the minimum received signal quality expected at the Receiver is achieved. The reason for the effect is that the adaptive pilot overhead allows reduction of pilot overhead whenever system conditions allow error free or operation under the tolerance error limit.

A second effect is that the system adaptively controls the pilot overhead according to the dynamic channel conditions. The reason for this effect is that dynamic system conditions are sensed and pilot overhead adaptively fixed based on this sensing.

BRIEF DESCRIPTION OF DRAWINGS

The above and other aspects, features, and advantages of the present disclosure will become more apparent from the following description of certain exemplary embodiments when taken in conjunction with the accompanying drawings, in which:

FIG. 2 is a flow diagram illustrating the flow of the operation of the related optical communication system.

FIG. 6 is a flow diagram illustrating the flow of the operation of embodiment 1.

FIG. 8 is a diagram illustrating the working of a Gaussian Mixture Model implementation of the system estimate means 208.

EXAMPLE EMBODIMENTS

Example embodiments of the present disclosure are described in detail below referring to the accompanying drawings.

Firstly, we explain a related optical communication system before describing Example embodiments of the present disclosure in detail.

Figure 1:
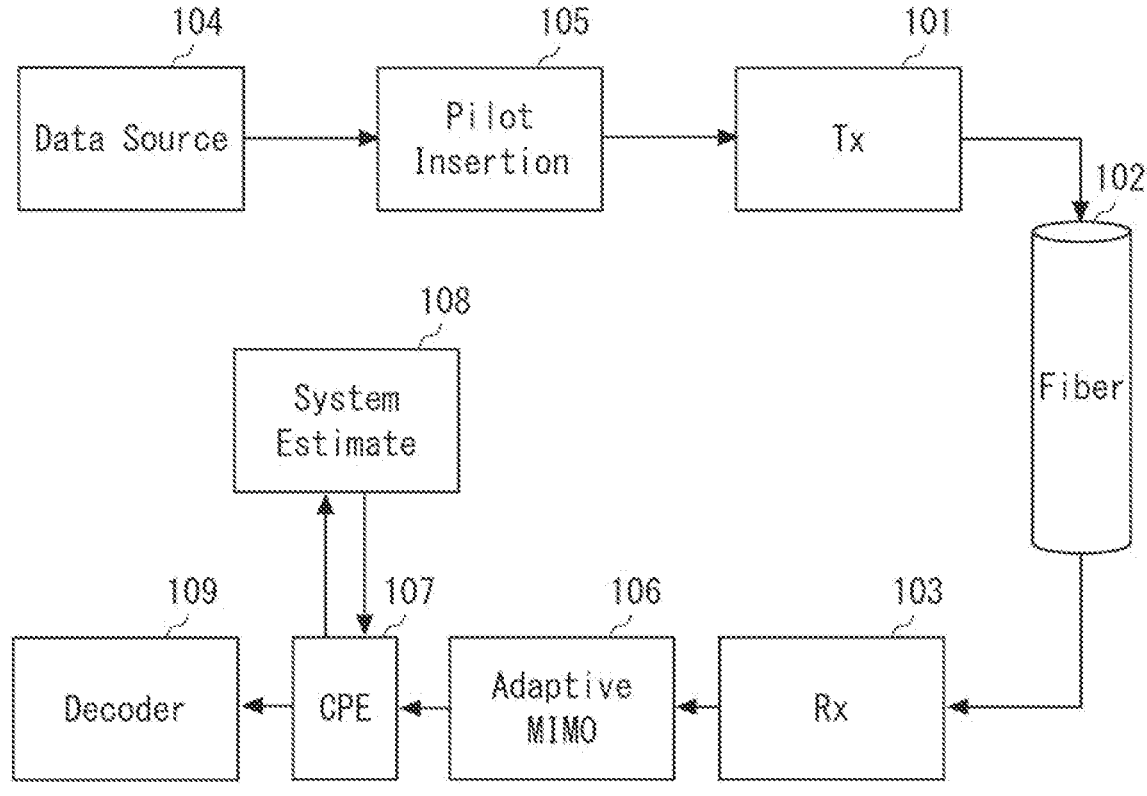
FIG. 1 is a block diagram illustrating an example of a related optical communication system.

An example of a related optical communication system with a training pattern based adaptive equalization is described in U.S. Pat. No. 9,559,786B2. As illustrated in FIG. 1, this related optical communication system includes a Transmitter means 101, Channel means 102 and Receiver means 103. Further the optical communication system includes a data source means 104 and pilot insertion means 105 positioned before the Transmitter means 101. Also, after the Receiver means 103, an adaptive equalizer means 106, Carrier Phase Estimation means 107, system estimate means 108 and a decoder means 109 are positioned.

Note that the above description of the related art and FIG. 1 is in accordance with a combination of Figures (FIG. 1A, FIG. 7A, and FIG. 7B) in the original document of U.S. Pat. No. 9,559,786B2.

The optical communication system having such a structure operates is described below with reference to FIG. 1 and FIG. 2. FIG. 2 is a flowchart depicting a possible operation flow of the optical communication system.

Specifically, the data source means 104 outputs the information to be transmitted which is encoded in the form of a transmission symbol of an appropriate modulation format. The pilot insertion means 105 inserts pilot symbols of specified (pre-defined) length in between the transmission symbols with the required periodicity to satisfy the pilot overhead ratio. In simple terms, the pilot overhead ratio may be described as the ratio of the number of training/pilot symbols inserted for a specified period of transmission symbols to the number of Total transmission symbols (including pilot) in the same specified period.

The transmit pattern formed after pilot insertion is passed to the transmitter means 101. The transmitter means 101 converts the digital signal to an electric signal with a data convertor, and then converts it into an optical modulated signal. The optical signal from the output of transmitter means 101 is then passed through the optical fiber channel means 102. The optical fiber channel 102 may consist of a single or multi core fiber with multiple modes (typically two modes/polarizations) through which the information is transmitted over the desired transmission distance. The present disclosure is mainly intended for fibers with coupling induced between channels which leads to a strong interference or cross-talk among the channels. The optical signal received from the output of optical fiber channel means 102 is passed to the receiver means 103. The optical signal is converted into the electrical signal form typically by a coherent receiver setup. After adequate processing to eliminate some transmission induced effects, the electrical signal is then converted into digital form by a data convertor. Further digital signal processing may be implemented at the receiver means 103 including matched filtering, chromatic dispersion compensation, frequency offset and dc compensation in any specified order. These implementations may follow standard techniques known in literature.

The samples (typically up-sampled version of received symbols) are the output from the receiver means 103. These up-sampled samples are then passed on to the adaptive equalizer means 106. Here the pilot signal pattern may be detected and utilized to learn the adaptive filter coefficients that recover the original transmitted symbols accurately. This learning may be achieved by a data-aided least mean square (DA-LMS) algorithm. Least Mean Square (LMS) algorithm is used to minimize the mean square error (MSE) between the desired equalizer output and the actual equalizer output. The learnt filter coefficients are then utilized by recovering the transmitted symbols until the arrival of the next pilot symbols. Upon arrival of the next pilot symbol pattern, the filter coefficients are again updated. After adaptive equalization, the Carrier Phase estimation means 107 is utilized to estimate and correct phase errors. The filter coefficient learning process may be as follows.

$$\text{Cost=transmitted pilot signal-equalized signal} \qquad (1)$$

$$\text{Adaptive filter tap=Adaptive filter tap-cost*step size*Received symbol} \qquad (2)$$

where the transmitted pilot signal is the ground truth for the received pilot signal, while equalized signal may refer to the signal outputted either by the adaptive equalizer means 106 or the carrier phase estimation means 107. Both implementations are logical and possible. Note that this cost function calculation is done only when the received signal corresponds to the pilot pattern.

In certain cases, the Carrier phase estimation (CPE) means 107 may achieve carrier phase estimation by utilizing the pilot signal information. The pilot signal information may be utilized by the CPE means 107 to estimate the distribution of the phase noise. This utilization includes utilizing optimized distribution learning algorithms such as Expectation Maximization (E-M) Algorithm. The output of the CPE means 107 is passed on to the decoder means to decode the received symbols into information bits. Note that the pilot symbols in the pattern inserted during the pilot insertion means 105 are discarded at this stage.

This above-mentioned operation may be further optimized as in NPL 1 where the pilot overhead ratio may be adjusted in an offline state by considering received transmission metrics such as Achievable information rate. After this optimization, using this optimized pilot overhead ratio the optical communication system is run in the online mode where no further pilot overhead optimization takes place.

However, in the related optical communication system, the frequent pilot pattern/training symbol requirement may reduce information throughput. The first problem results from frequent pilot pattern being required by the adaptive MIMO equalization mechanism to keep track of system dynamics and optimize signal recovery.

Furthermore, a second problem is that the fixed pilot overhead ratio is set in the system expecting the worst expected dynamic condition. The system may not always experience this worst dynamic condition so optimal operation may be possible with a lower pilot overhead ratio. The second problem results from the fixed pilot overhead used for a dynamically changing system condition.

The present disclosure has been made to solve this problem. An adaptive pilot overhead system includes a symbol estimate means that allows adaptive equalization with and without pilot signals, an adaptive trigger pilot means that senses the optical communication and adaptively adjusts the overhead ratio according to the system estimate means measurement, and a pilot insertion means that adaptively adjust the pilot overhead ratio according to the feedback from the trigger pilot means using pilot patterns which are common knowledge at both transmitter and receiver.

First Example Embodiment

[Explanation of Structure]

First, a first example embodiment of the disclosure is described below referring to the accompanying drawings.

Figure 3:
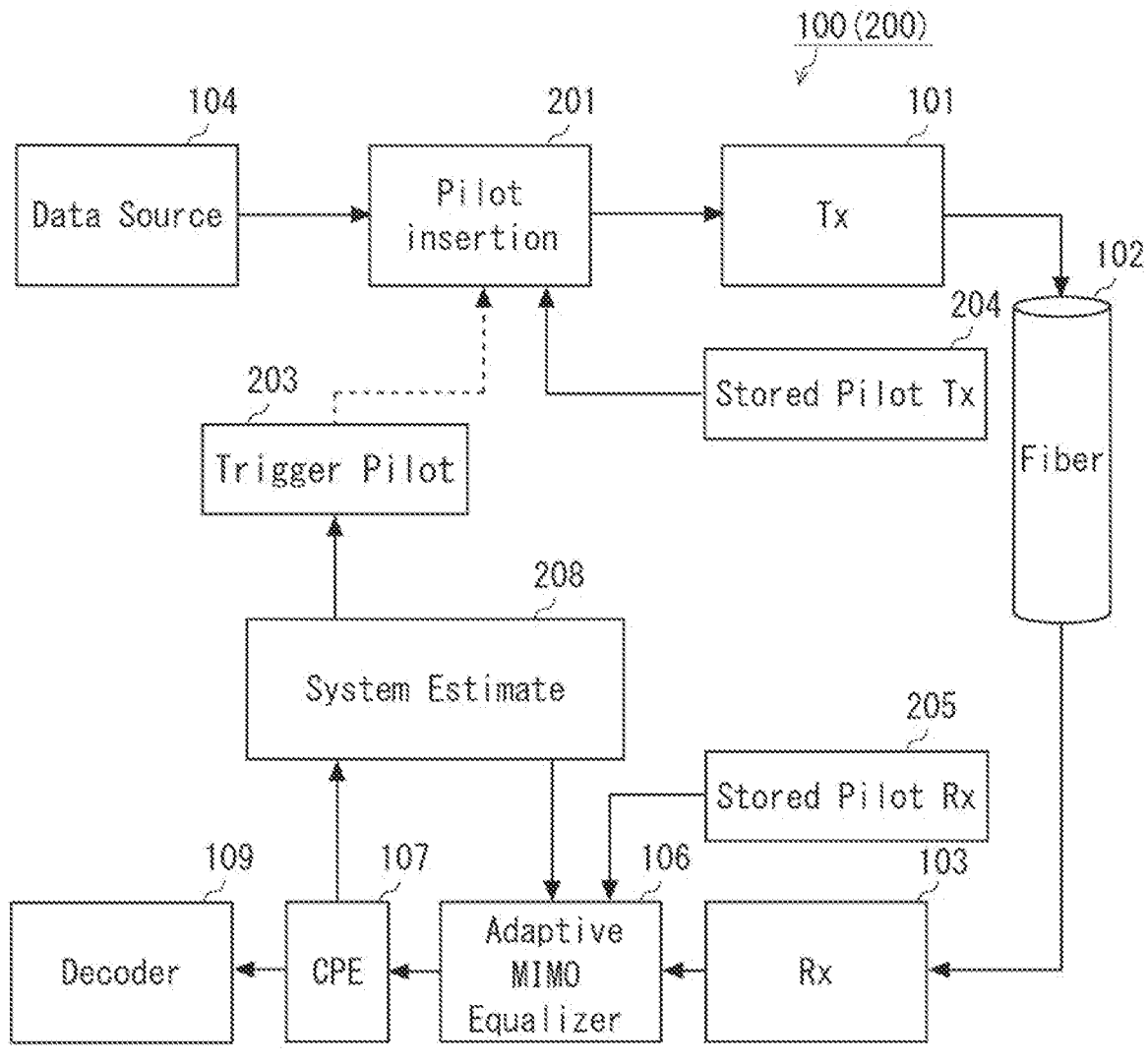
FIG. 3 is a block diagram illustrating the block diagram of embodiment 1.

Referring to FIG. 3, an optical communication system according to the first example embodiment of the present disclosure includes a computer (which may be referred to as central processing unit; processor; or data processing device) 200 that is program-controlled, with means similar to that in the related optical communication system and components additional to those related system. The additional components may be pilot insertion means 201, trigger pilot means 203, system estimate means 208, stored pilot Tx means 204 and stored pilot means Rx 205. The additional means are either included as completely new components or as an improvement on the existing components.

The computer (central processing unit; processor; data processing device) 200 may include Data source means 104, Pilot insertion means 201, Transmitter (Tx) means 101, Optical fiber channel means 102, receiver (Rx) means 103, Adaptive MIMO equalizer means 106, Carrier Phase estimation means 107, System estimate means 208, Trigger Pilot means 203 and decoder means 109 in addition to the stored pilot Tx means 204 and stored pilot Rx means 205.

In other embodiments, an optical communication system may include a first computer 100, and a second computer 200 which are connected via Optical fiber channel means 102 to each other. The first computer 100 may include Data source means 104a, Pilot insertion means 201a, Transmitter (Tx) means 101a, receiver (Rx) means 103a, Adaptive MIMO equalizer means 106a, Carrier Phase estimation means 107a, System estimate means 208a, Trigger Pilot means 203a and decoder means 109a along with stored pilot Tx means 204a and stored pilot Rx means 205a. The second computer 200 may include Data source means 104b, Pilot insertion means 201b, Transmitter (Tx) means 101b, receiver (Rx) means 103b, Adaptive MIMO equalizer means 106b, Carrier Phase estimation means 107b, System estimate means 208b, Trigger Pilot means 203b and decoder means 109b in addition to the stored pilot Tx means 204b and stored pilot Rx means 205b. The Transmitter (Tx) means 101a is connected via the Optical fiber channel means 102 with the receiver (Rx) means 103b.

These means generally operate as follows.

The Data source means 104 converts the bit encoded data (e.g., 1, 0 format) into a modulated symbol format suitable to be transmitted through the optical channel. The Pilot Insertion means 201 inserts pilot symbols in a modulated format between the modulated data symbols as is done by Pilot Insertion means 105. The crucial difference in Pilot Insertion means 201 compared to Pilot Insertion means 105 is that the former the rate at which pilot signal is inserted in between the data symbols is variable.

The Transmitter means 101 converts the digital signal which contains the modulated signal to an electrical signal and then an optical signal which can be transmitted through the optical channel. The Transmitter means 101 may include various devices such as DAC, and DA (Driving Amplifier), which implement the various digital signal processing functions required for preparing the transmission signal from the modulated symbol data.

The optical Fiber channel means 102 includes a fiber channel through which information is transmitted in the optical modulation format. The Receiver means 103 includes devices configured to convert the modulated optical signal back into the digital form by a demodulation technique. The receiver means 103 may have additional processing capabilities such as chromatic dispersion compensation.

The Adaptive equalizer filter means 106 is provided with a multiple input multiple output (MIMO) filter for eliminating the cross-talk or interference between the symbols. This interference or cross-talk may be symbols transmitted over time (modal dispersion) or over space (over multiple-modes). The Carrier Phase Estimation (CPE) means 107 estimates and compensates carrier phase errors in the equalized signal.

The system estimate means 208 learns the signal characteristics from the equalized signals using a learning method to achieve two objectives. The first objective is to estimate the decoded signal from the equalized signal. The second objective is to predict the changes in the signal characteristics which necessitate the need for a pilot signal-based equalizer tap learning. The estimation and prediction methodology utilized may include any supervised learning algorithms (taking advantage of the ground truth during the pilot symbol transmission and in certain cases even the ground truth established from the blind equalized symbol).

The trigger pilot means 203 adapts the pilot overhead ratio depending on the channel conditions sensed by utilizing the parameters inferred from the various means in the optical communication system. The inferred parameters may be mainly from the system estimate means 208 or Adaptive equalizer filter 106.

The Stored Pilot Tx means 204 and Stored Pilot Rx means 205 store the pilot pattern information. Typically, a very large length pilot pattern corresponding to the maximum pilot overhead ratio possible in the optical communication system is stored. This allows operating at all pilot patterns up to the maximum pilot overhead ratio of the optical communication system as long as the pilot pattern is known at both transmitter and receiver.

The decoder means 109 decodes the equalized signals into decoded symbols or bits by using any known decoding rule such as Maximum likelihood. These means disclosed in the First Embodiment mutually operate in such a way that dynamic pilot overhead optimization is done to achieve system throughput maximization.

[Description of Operation]

Figure 4:
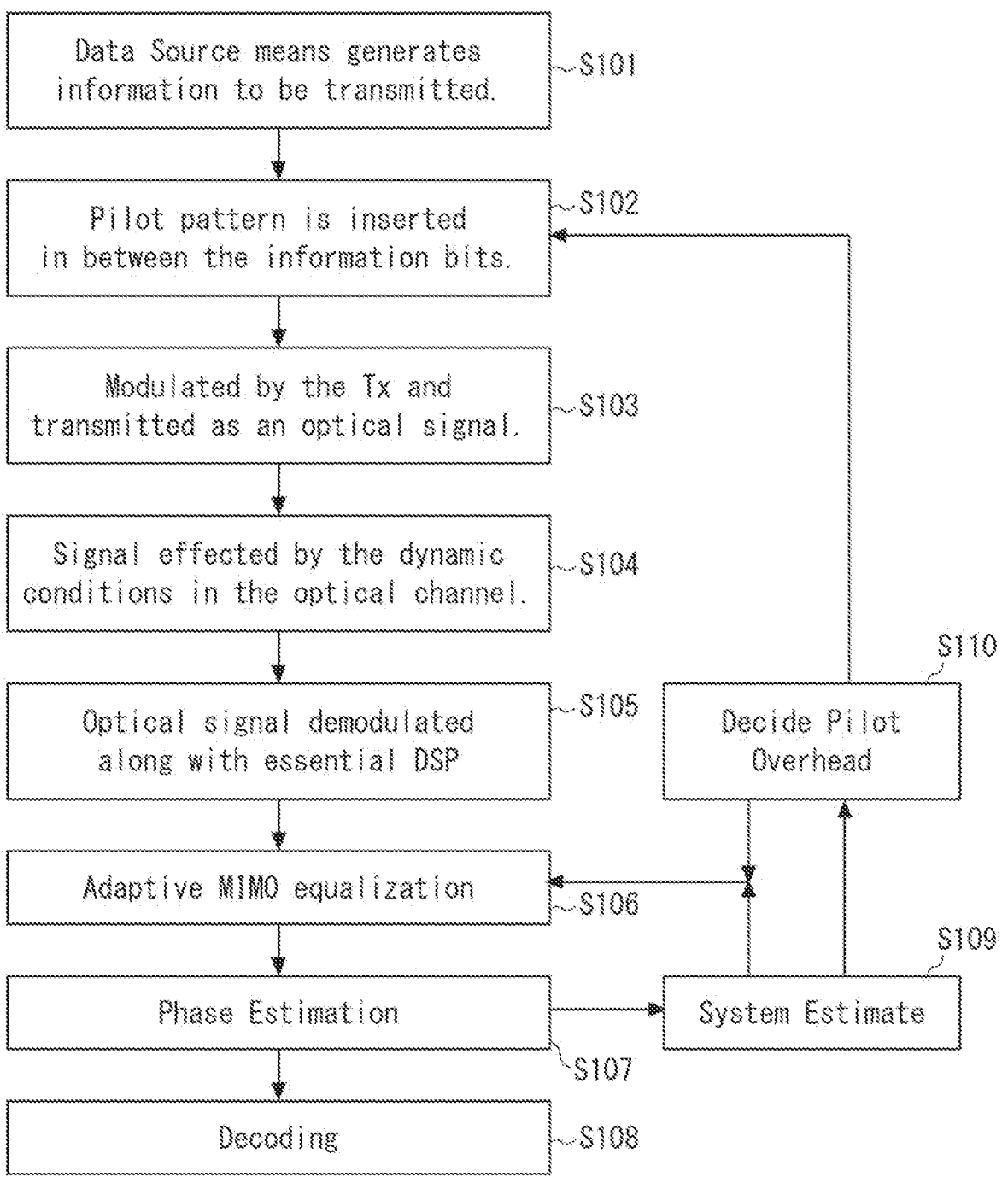
FIG. 4 is a flow diagram illustrating the flow of the operation of embodiment 1.

Next, referring to flowcharts of FIG. 4, the general operation of the present example embodiment is described.

Note that steps S102, S106, S109, S110 are the critical steps that differentiate this disclosure from the related optical communication system described above.

First, in step S101, the Information to be transmitted is encoded into symbols form in the suitable modulation format using Data source means 104.

Then in step S102, Pilot symbols are inserted in between the modulated information to be transmitted at an adaptive pilot overhead rate in Pilot Insertion means 201. The optical communication system is started with an initial state pilot overhead ratio R0. This ratio indicates that R0*N of modulated symbols in a transmission frame with a pre-defined frame length N consists of pilot symbols. These inserted pilot patterns are known to both the transmitter and the receiver (particularly at Adaptive MIMO equalizer means 106 and Carrier Phase Estimation 107). This may be achieved by having a pilot pattern of a pre-defined maximum length known and stored at both the Tx side and Rx side. Depending on the selected pilot overhead ratio, a required length is chosen from the stored patterns to satisfy the overhead ratio.

Further, in step S103, the transmitted signal that is output from Pilot Insertion means 201 after pilot insertion is converted to a form that can be transmitted through the optical channel. In S104, the signal passes through the optical fiber channel means 102. The Signal is effected by the dynamic conditions in the optical channel. The optical signal from optical fiber channel means 102 is demodulated by receiver means 103 so as to recover the received signal in digital form along with essential DSP in Step S105. The received demodulated signal is passed through the adaptive MIMO equalizer means 106 so that optical effects induced by the optical fiber channel means 102 such as interference are eliminated. In S107, a Carrier Phase Estimation (CPE) algorithm is utilized to correctly estimate the carrier phase error.

After this step S107, the signal which has been equalized and carrier phase corrected is utilized by a system estimate means 208 to learn the signal characteristics. The steps S106 and S107 may be implemented jointly in certain implementations. The noise estimate means may be implemented as an unsupervised learning algorithm such as the Gaussian Mixture Model where the number of clusters is adjusted to match the constellation order and the cluster initial characteristics inferred from the received pilot signals. This ensures a quicker convergence when the GMM is run on collected equalized signal to learn the current signal characteristics. This approach is illustrated in detail using the pseudo-code available in FIG. 8.

Another approach to implement this means may be a time series statistical estimation and prediction means such as Kalman filter whose state variables can be designed to accurately estimate the system conditions. Another method that could be utilized is a supervised learning algorithm such as Recurrent Neural Network (RNN) or Artificial Neural Network. The following may be a possible implementation. Using the available pilot data in the temporal form, a learning is undertaken with the input being the temporal data at the receiver while the output being an estimate of the system noise or symbol drift. Symbol drift here may refer to the absolute error of the received symbol from the closest or most related symbol. After completion of training using data generated from the optical system under consideration (or from any system which exhibits similar characteristics), the system is run in a decision mode where system estimate measure is outputted as a prediction. Transfer learning may be utilized to quickly learn the dynamic changes in the system at next pilot instant if necessary.

Note that the system estimate means 208 is implementation in any of the above methods combined together so that the means 208's objective of generating relevant output which can be utilized by trigger pilot means 203 with or with-out post processing can be achieved.

The system estimation output in step S109 is also utilized by the adaptive MIMO equalizer means 106 to compute the error/cost function that is required to update its taps when no pilot is present in the processed data. This functionality is a known effect and can be considered as being within the claims of the background art and thus cannot be considered as an improvement. In-case the pilot is present, the corresponding transmitted pilot sequence is utilized as the ground truth for computing the cost/error. Alternatively, in the absence of the pilot, the system estimate is used to construct an intermediate decoder internally in the adaptive MIMO equalizer means 106 whose output is used as the ground truth. This process can be described mathematically as $$Cost = \begin{cases} \text{transmitted pilot signal} - \text{Equalized Signal (with pilot)} \\ \text{estimated transmit signal} - \text{Equalized Signal (without pilot)} \end{cases} \quad (3)$$

$$\text{Adaptive filter tap} = \quad (2)$$

$$\text{Adaptive filter tap} - \text{cost} * \text{step size} * \text{Received symbol}$$

Also, this output from the system estimate means 208 is passed on to the trigger pilot means 203. In Step S110, the trigger pilot means 203 computes the desired pilot overhead ratio for the next transmission. The trigger pilot utilizes the noise estimate in the symbols and the error estimate generated by utilizing this noise estimate in a manner similar to that in fashion as a cost metric estimation. These cost metric values are tracked over time and utilized to decide the pilot overhead ratio Ri associated with future transmission frames. This may be mathematically modelled as $$R_i = f(\text{cost}(t), \text{filter tap values,noise estimate}) \quad (4)$$

Where cost(t) is the MIMO filter error estimate "Filter taps values" correspond to the filter taps for the MIMO filter "Noise estimate" refers to the signal characteristics learnt by the System estimate means 208.

A possible implementation of the function f(.) may involve utilizing the inputs to compute the state of the system as an intermediate state. This computation of the state may be a piece-wise function where state of the inputs is utilized as conditions to generate a state of the system which in turn is used to generate the required pilot overhead ratio. There exist relations between the system noise and cost function magnitude to the expected pilot overhead value as output. These relations are dependent on the channel being considered and can easily be established by known theory and updated as available data is collected in the system online state. For example, noisier estimate equates to a higher pilot overhead ratio. Similarly, dynamic change in the filter tap responses compared to the previous state could indicate need for a higher pilot overhead ratio. In cases where the cost function is low, the pilot overhead may be reduced depending on the other inputs.

The above described trigger pilot means 203 may also be alternatively implemented as a look-up table with pre-decided overhead ratios for various observed system conditions. This implementation may be beneficial in reducing the processing time associated with the trigger pilot means 203.

Note that the next transmission may refer to the next information symbols to be transmitted at the Transmitter considering the latency of the feedback from trigger pilot means 203 to the Pilot Insertion means 201. The Ri learnt is updated at the pilot insertion means 201 and at the equalizer means 106 so that appropriate pilot patterns are extracted from the stored pilot patterns so that system works optimally for the updated pilot overhead ratio.

This feedback overhead value is then utilized by the trigger pilot means 203 in step S102 to insert the required pilot symbols. The output of the trigger pilot means 203 is also given to the adaptive MIMO equalizer means 106 so the adaptive MIMO equalizer means 106 can correctly operate in the presence of a pilot.

[Description of Effect]

Next, the effect of the present example embodiment is described.

As the present example embodiment is configured in such a manner that pilot signal overhead ratio is adaptively adjusted depending on the dynamic channel conditions.

In addition, the example embodiment is configured in such a manner that adaptive pilot overhead leads to an improvement of the average throughput of the system compared to that of the system with fixed pilot overhead ratio. This is made possible since the pilot overhead ratio can be adaptively changed according to the channel conditions experiences more than the fixed pilot overhead ratio in the related art. The fixed pilot overhead ratio in related art ideally corresponds to the pilot overhead ratio required to operate within prescribed communication error thresholds for the worst possible dynamic condition in the channel. Accordingly, an adaptive pilot overhead control leads to an improvement of the system throughput since the system does not always have to operate in accordance with the expectation that the worst case channel conditions will exist.

Second Example Embodiment

[Explanation of Structure]

Figure 5:
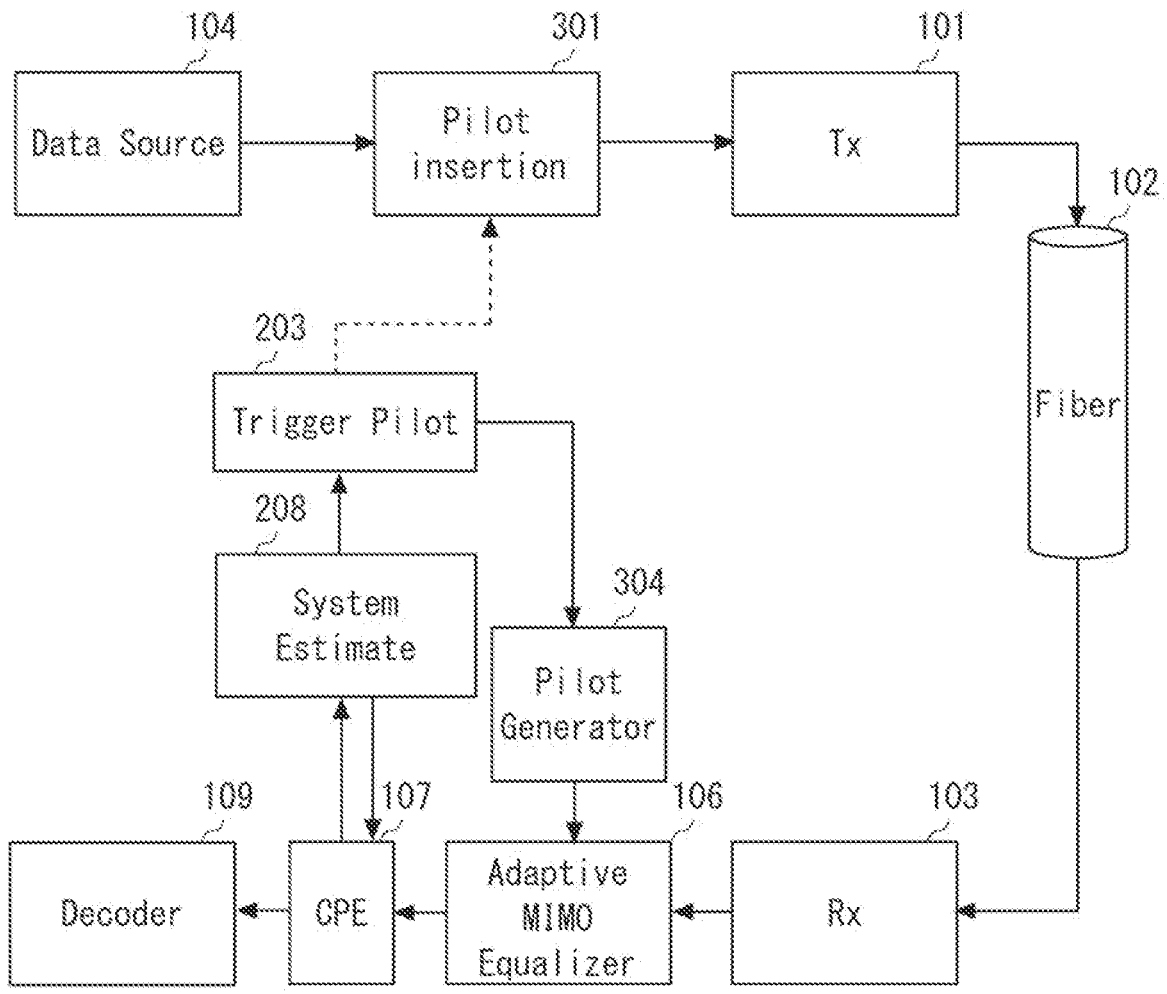
FIG. 5 is a block diagram illustrating the block diagram of embodiment 2.

Next, a second example embodiment of the present disclosure is described referring to FIG. 5. Note that this embodiment is identical in every respect to the previous embodiment except for the providing of a Pilot insertion means 301 and Pilot Generator means 304. The operation of all other means of the second embodiment function and operate in a manner identical to the manner in which the described corresponding means of the first example embodiment function and operate.

The Pilot Generator means 304 generates a pilot signal which is utilized for a particular selected pilot overhead ratio. This ensures that a unique pilot signal is available for every selected pilot overhead ratio. The Pilot Generator means 304 is particularly useful when a pilot signals for a given pilot overhead ratio need to satisfy certain characteristics such as orthogonality over the pilot transmit length.

The pilot insertion means 301 is identical in its function as described in Pilot Insertion means 201 to the additional capability to generate the pilot pattern for a given pilot overhead ratio. Note that this pattern is identical to the pattern generated by the Pilot Generator means 304. The pilot insertion means 301 and the Pilot Generator means 304 mutually operate in such a way that dynamic pilot overhead optimization is done to achieve system throughput maximization.

Next, referring to flowcharts in FIG. 6, the general operation of the present example embodiment is described. The flowchart described in FIG. 6 is identical to the Flowchart in FIG. 4 except for two very critical steps. These steps namely S202 and S211 will be described in detail. The rest of the general operation of the second embodiment is identical to that of the first embodiment.

In S202, a Pilot pattern which is to be inserted in between the modulated symbols is generated for the required length to satisfy the pilot overhead ratio required (initial or the generated pilot overhead ratio from S101 generated by the trigger pilot means 203). This step differs from the implementation in the first embodiment, where the pilot pattern is pre-generated before start of operation and stored.

In S211, depending on the pilot overhead ratio of the system as dictated/set by the trigger pilot means 203 (or initial setting at start of operation), the pilot pattern is generated by the pilot generator means 304 to be used by the adaptive MIMO equalizer means 106 (and other relevant means) at the receiver side. Note that this pattern is identical to the pattern generated at the transmitter for pilot insertion by the pilot insertion means 301.

The pilot generation at both the pilot insertion means 301 and the pilot generator means 304 may utilize Constant amplitude Zero Autocorrelation (CAZAC) sequences. As the name indicates, these sequences have a constant amplitude (since they are generated on the unit circle) and zero correlation between different length sequences. These sequences for a particular length N can be generated by using a particular fixed formula such as $$x_k = e^{-i\frac{m.\pi.k.k}{N}} \tag{5}$$

Where the $x_k$ is the kth symbol in the pilot pattern of length N (N may be an even number in this case). M is a fixed prime number such that HCF(N, M)=1 (i.e., M and N are co-primes).

[Description of Effect]

Next, the effect of the present example embodiment is described.

As the present example embodiment is configured in such a manner that a pilot signal overhead ratio is adaptively adjusted depending on the dynamic channel conditions. In addition, the present example embodiment is configured in such a manner that an adaptive pilot overhead leads to an improvement of the average throughput of the optical communication system compared to that of the optical communication system with a fixed pilot overhead ratio. This is made possible since the pilot overhead ratio can be adaptively changed according to the channel conditions experiences more than the fixed pilot overhead ratio in the related art. The fixed pilot overhead ratio in related art ideally corresponds to the pilot overhead ratio required to operate within prescribed communication error thresholds under the worst possible dynamic condition in the channel. Accordingly, an adaptive pilot overhead control leads to an improvement of the system throughput since the system does not always have to operate in accordance with the expectation of the worst case channel conditions existing.

[Example]

Next, the operation of a mode for carrying out the present disclosure is described by way of a concrete example. An example corresponding to the implementation of the first embodiment is given.

Referring to FIG. 5, an optical communication system including a multi-mode fiber having N modes is selected. This ensures that the optical fiber channel means 102 consist of N channels. Also, the adaptive MIMO equalizer means

106 is N×N equalizer. N×N equalizer translates to a total N×N filters with tap lengths M that are required to implement the adaptive MIMO equalizer means 106. Also, a Pilot/training pattern is required for each of these N channels.

To begin, an appropriate modulation format to encode symbols in the Data source means 104 is selected. For a 16 QAM modulation format, four bits are encoded as a single symbol with a total of 16 possible transmit symbols. For an Initial Pilot overhead ratio of $R_0$, the data from the Data source means 104 is organized into data frames with $P_0$ pilot symbols and Do data symbols so that the pilot overhead ratio is satisfied as follows.

$$R_0 = \frac{P_0}{P_0 + D_0} \qquad (6)$$

The $P_0$ pilot symbols may use the same modulation format as that used in the Data source means 104. The pilot signal for a symbol length equal to the max permissible pilot overhead ratio is generated and stored in the Stored Pilot Transmitter means 204 and the Stored Pilot Receiver means 205. The generation may be a known formula or random initialized generation, but the patterns stored in the means 204 and 205 must be identical to each other.

Since there are N channels, N parallel data frames are constructed for transmission. In some embodiments, the bits to symbols in data source means 104 may also be allocated to the channel in which the selected symbol needs to be transmitted. After insertion of a pilot and formation of the data frame in the Pilot Insertion means 201, the frames are passed to the Transmitter means 101 where the modulated symbols are transmitted. After the modulated signal is passed through the optical channel 102, recovery by a coherent demodulation scheme is done at the Receiver means 103. Separate and parallel coherent receiver processing may be implemented here. Various channel signal effects such as Timing offset, chromatic dispersion compensation, etc., may be compensated at this stage using widely known techniques in literature.

After this, the signal output from the Receiver means 103 is passed on the adaptive equalizer means 106. In this situation, N×N filters with M taps are implemented. The filter tap coefficients are initialized to some preset value to ensure fast convergence typically central tap coefficient set to unity. The training may start with filter taps initialized to some known values. This ensures quick convergence of the filter taps to optimal values (which ensure channel effect inversion functionality). The typical initialization is to set the central tap to unity. (i.e., for example for 121 tap length filter, the 60th tap is set to 1). Assuming that the initially received signals are transmitted pilot patterns (which may be ensured by using synchronization techniques in Receiver means 103), Data-aided Least means square algorithm is utilized to learn the filter taps which decode the transmit pattern accurately. Note that in this scenario, the ground truth (transmit pattern) is known. During the case when the transmit pattern is not known, when data symbols are being processed, the filter tap values learnt previously are utilized to equalize the signal. After equalization, a decoding of the equalized symbol is done using the information such as modulation and the channel noise estimates. This implementation may follow any of the blind equalization techniques known in literature.

After this, Carrier phase estimation is done using techniques such as a Viterbi-Viterbi algorithm in a Carrier phase estimation means 107. This implementation is also considered to be a known technique. The signal that is output at the Carrier phase estimation means 107 is passed on to a Decoder means 109 to be decoded back to a bits format. A copy of this signal is passed to the system estimate means 208. In this example, we utilize an unsupervised statistics-based learning rule namely a Gaussian Mixture Model (GMM). Alternate implementations such as Kalman filters or Recurrent Neural Networks (RNN) are also possible. The signals that are output from the Carrier phase estimation means 107 are collected for pre-decided symbol length or time. In the system estimate means 208, we run a GMM over the collected data to learn the signal characteristics like mean and variance for the cluster centers. The number of clusters are selected as the modulation order (16 clusters for 16 QAM modulated data).

After convergence, this learnt characteristics is passed on to the trigger pilot means 203. Also, the learnt characteristics may be passed to the adaptive MIMO equalizer means 106 to better decode the equalized signal in the blind equalization algorithm. In the trigger pilot means, a look table is constructed and stored. The learnt characteristics obtained from the system estimate means, the error estimate and tap coefficients obtained from the MIMO equalizer 106 are used as input to the look-up table. The pilot overhead ratio is selected from the lookup table based on the inputs. This lookup table may be constructed so that input corresponding to all modes are considered in the lookup table.

After pilot trigger decides the new pilot overhead ratio $R_1$, it is communicated to the Pilot Insertion means 201. The Pilot Insertion means 201 adjusts the new pilot ratio by inserting $P_1$ Pilot symbols so that the new pilot insertion ratio is satisfied.

Figure 7:
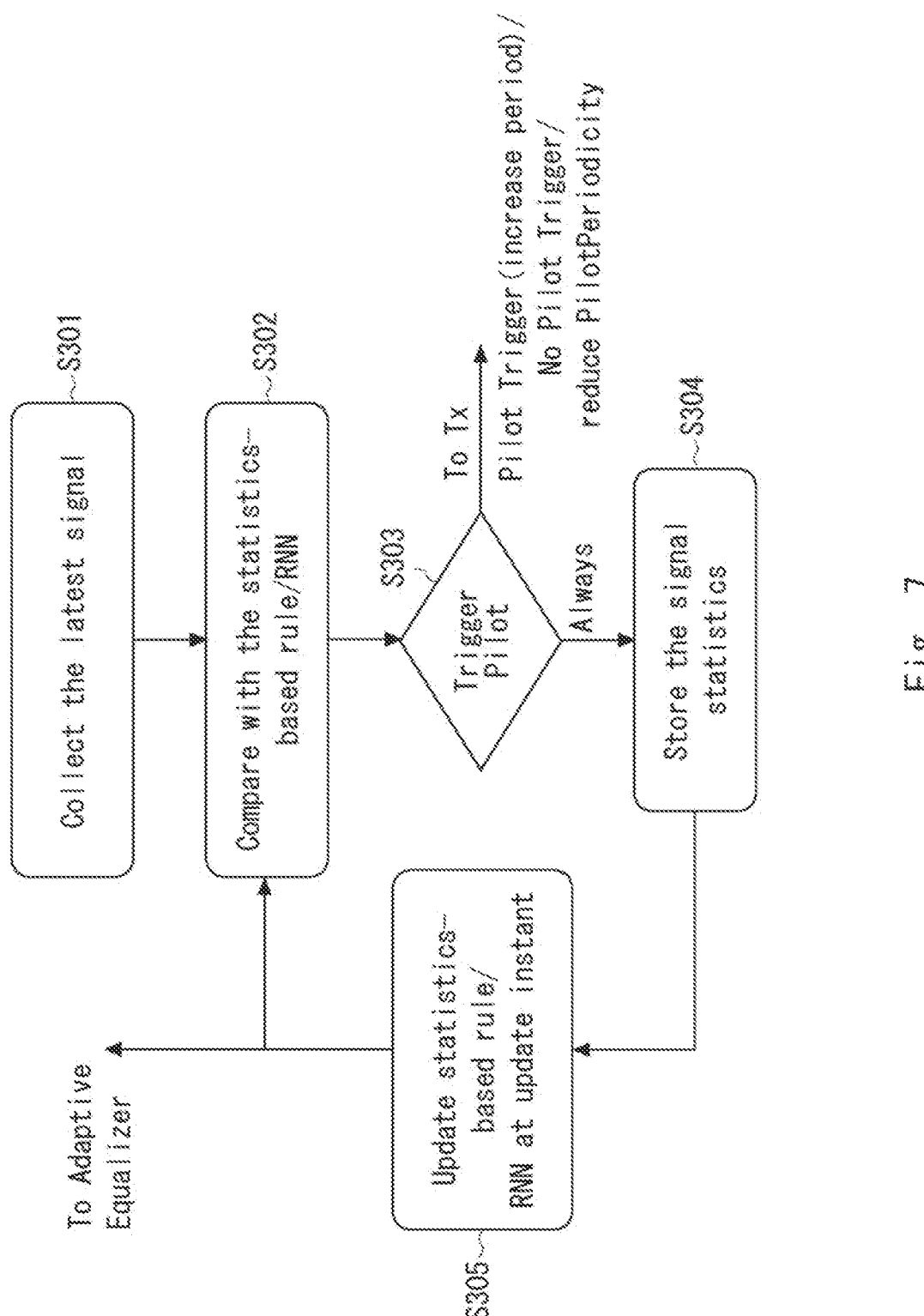
FIG. 7 is a flowchart illustrating a detailed example utilizing embodiment 1 in which the operation of the system estimate and pilot insertion means are especially highlighted.

The key process flow in this example may be summarized as follows. Referring to FIG. 7 and FIG. 8, in step S301, the signals for a fixed length are collected by the system estimate means 208. The system estimate means 208 uses a statistics/learning based tool to estimate signal characteristics in step S302. This learned characteristics is passed on to the Trigger pilot means 203 in step S303 where a lookup table based decision on the optimal pilot overhead is made and passed on to the Pilot Insertion means 201. The signal statistics and the new pilot overhead information are stored in S304 in the storage of the receiver. In step S305, this information is utilized as the initial setting for the GMM for the next collected signal in step S302. Also, information is passed on to the adaptive equalizer so the blind equalization utilizes the learnt statistics and also the pilot overhead ratio is known during equalization process so that data-aided and blind equalization can be appropriately selected. This process keeps on repeating as Signals as collected in S301 leading to a dynamic adaptation of the pilot overhead ratio for transmission.

Figure 9:
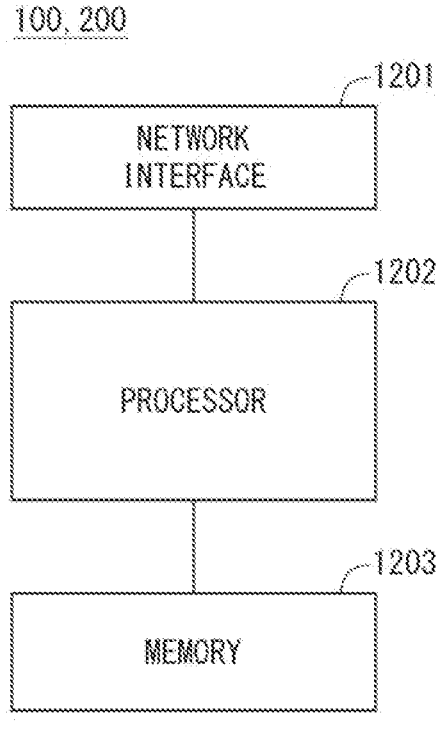
FIG. 9 is a block diagram illustrating the configuration example of the Computer 100, 200.

FIG. 9 is a block diagram illustrating the configuration example of the Computer 100 or 200. In view of FIG. 9, the Computer 100 or 200 includes a network interface 1201, a processor 1202 and a memory 1203. The network interface 1201 is used to communicate with a network node (a remote node 10 and the core network 40). The network interface 1201 may include, for example, a network interface card (NIC) compliant with, for example, IEEE 802.3 series.

The processor 1202 performs processing of a center node 20 described with reference to the sequence diagrams and the flowchart in the above embodiments by reading software (computer program) from the memory 1203 and executing the software. The processor 1202 may be, for example, a microprocessor, an MPU or a CPU. The processor 1202 may include a plurality of processors.

The processor 1202 may include a plurality of processors. For example, the processor 1004 may include a modem processor (e.g., DSP) which performs the digital baseband signal processing, a processor (e.g. DSP) which performs the signal processing of the GTP-U, UDP/IP layer in the X2-U interface and the S1-U interface, and a protocol stack processor (e.g., a CPU or an MPU) which performs the control plane processing.

The memory 1203 is configured by a combination of a volatile memory and a non-volatile memory. The memory 1203 may include a storage disposed apart from the processor 1202. In this case, the processor 1202 may access the memory 1203 via an unillustrated I/O interface.

In the example in FIG. 9, the memory 1203 is used to store a software module group. The processor 1202 can perform processing of the Computer 100, 200 described in the above embodiments by reading these software module groups from the memory 1203 and executing the software module groups.

As described with reference to FIG. 4, 6, or 7, each processor of the Computer 100, 200 in the above embodiments executes one or a plurality of programs including the command group for causing a computer to execute the algorithm described with reference to the drawings.

In one embodiment, an optical communication system for transmitting an optical signal from a transmitter via an optical channel to a receiver, includes a pilot insertion means, a system estimate means, and a trigger pilot means. The pilot insertion means is configured to insert training or pilot signals at a desired pilot overhead ratio. The system estimate means is configured to estimate and characterize the signal recovered from the optical channel. The trigger pilot means is configured to utilize the estimated signal characteristics to access the channel conditions and fix the required pilot overhead ratio.

The programs mentioned in this disclosure include instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the example embodiments disclosed above can be described as, but not limited to, the following supplementary notes.

<Supplementary Notes>

(Supplementary Note 1)

An optical communication system for transmitting an optical signal from a transmitter via an optical channel to a receiver; the system comprising:

a pilot insertion means for inserting training or pilot signals at a desired pilot overhead ratio in an online operation state;

a system estimate means for estimating and characterizing the signal recovered from the optical channel utilizing adaptive filter parameters and estimated noise characteristics in the signal; and, a trigger pilot means for utilizing information from the system estimate means to determine channel conditions and fix the required pilot overhead ratio.

(Supplementary Note 2)

The optical communication system according to supplementary note 1, wherein:

the system is a multi-mode optical communication system configured to implement adaptive pilot overhead ratio functionality.

(Supplementary Note 3)

The optical communication system according to supplementary note 1 or 2 wherein:

the system is configured to estimate a channel noise and rate of dynamic change by utilizing the received signal and its adaptive equalization parameters learnt from equalizing the received signal.

(Supplementary Note 4)

The optical communication system according to any one of supplementary notes 1 to 3 wherein:

the system estimate means and trigger pilot means is implemented in the form of a of lookup table and the values of the lookup table is updated as the system is online based on the received signal characteristics.

(Supplementary Note 5)

The optical communication system according to any one of supplementary notes 1 to 4, wherein:

the pilot insertion means includes sub means for either storing or generating training or pilot signal which can be reproduced accurately at the receiver, and further comprising a pilot generator means or storage means for producing a version of the transmitted pilot for the system operating pilot overhead ratio.

(Supplementary Note 6)

The optical communication system according to any one of supplementary notes 1 to 5, wherein: the system estimate means for utilizing an unsupervised or supervised learning algorithm to estimate the channel condition in optimizing the pilot overhead ratio.

(Supplementary Note 7)

The optical communication system according to any one of supplementary notes 1 to 6, wherein:

the system estimate means aids the filter coefficient learning algorithm implemented in the adaptive equalization especially in the operating condition with no pilot signal.

(Supplementary Note 8)

The optical communication system according to any one of supplementary notes 1 to 7, wherein:

an adaptive pilot overhead optimization is implemented for a multi channel optical fiber with multiple pilot signals and variable pilot overhead ratio possible for each channel.

(Supplementary Note 9)

The optical communication system according to any one of supplementary notes 1 to 8, wherein:

multiple pilot signals are utilized for transmission in the pilot insertion means and the pilot generator means maintains properties such zero correlation for all possible pilot overhead ratios.

(Supplementary Note 10)

The optical communication system according to any one of supplementary notes 1 to 9, wherein:

the trigger pilot means implemented at the receiver side of the optical communication system is configured to communicate reliably with the pilot insertion means.

(Supplementary Note 11)

An optical communication method for transmitting an optical signal from a transmitter via an optical channel to a receiver; the method comprising:

inserting training or pilot signals at a desired pilot overhead ratio in an online operation state;

estimating and characterizing the signal recovered from the optical channel utilizing adaptive filter parameters and estimated noise characteristics in the signal; and, utilizing information obtained from the estimated signal to determine channel conditions and fix the required pilot overhead ratio.

(Supplementary Note 12)

A program that causes a computer to execute an optical communication method for transmitting an optical signal from a transmitter via an optical channel to a receiver; the method comprising:

inserting training or pilot signals at a desired pilot overhead ratio in an online operation state;

estimating and characterizing the signal recovered from the optical channel utilizing adaptive filter parameters and estimated noise characteristics in the signal; and, utilizing information obtained from the estimated signal to determine channel conditions and fix the required pilot overhead ratio.

INDUSTRIAL APPLICABILITY

The present disclosure is applicable to optical communication where training signals are inserted to aid the adaptive equalization at the receiver performed using a data aided learning algorithm. This present disclosure is also applicable to an optical communication including multiple channels which may be implemented as a Multi-Mode, Multi-Core Fiber where a multiple input multiple output data aided adaptive equalizer is operated. This present disclosure is specifically utilized to adjust the training signal length requirement depending in the channel conditions for the above-described system.

The present disclosure is also applicable to wireless communication with multiple transmit and receiver antennas where adaptive equalization using transmitted training signals is desired to recover the transmitted information at the receiver.

What is claimed is:

1. An optical communication system for transmitting an optical signal from a transmitter via an optical channel to a receiver; the system comprising:

at least one memory storing instructions, and at least one processor configured to execute the instructions to;

insert training or pilot signals at a desired pilot overhead ratio in an online operation state;

estimate and characterize the signal recovered from the optical channel utilizing adaptive filter parameters and estimated noise characteristics in the signal;

utilize information obtained from the estimated signal to determine channel conditions and fix the required pilot overhead ratio; and estimate a channel noise and rate of dynamic change by utilizing the received signal and its adaptive equalization parameters learnt from equalizing the received signal.

2. The optical communication system according to claim 1, wherein:

the optical communication system is a multi-mode optical communication system configured to implement adaptive pilot overhead ratio functionality.

3. The optical communication system according to claim 2 wherein:

the system estimation and the adaptive pilot overhead ratio functionality of the at least one processor is implemented in the form of a of lookup table and the values of the lookup table is updated as the optical communication system is online based on the received signal characteristics.

4. The optical communication system according to claim 1, further including sub unit configured to either store or generate training or pilot signal which can be reproduced accurately at the receiver, and the at least one processor is configured to produce a version of the transmitted pilot for the system operating pilot overhead ratio.

5. The optical communication system according to claim 1, wherein: the at least one processor is configured to utilize an unsupervised or supervised learning algorithm to estimate the channel condition in optimizing the pilot overhead ratio.

6. The optical communication system according to claim 1 wherein:

an adaptive pilot overhead optimization is implemented for a multi channel optical fiber with multiple pilot signals and variable pilot overhead ratio possible for each channel.

7. The optical communication system according to claim 1 wherein:

multiple pilot signals are utilized for transmission and the at least one processor is configured to maintain properties such zero correlation for all possible pilot overhead ratios.

8. The optical communication system according to claim 1, wherein:

the at least one processor is configured to aid the filter coefficient learning algorithm implemented in the adaptive equalization especially in the operating condition with no pilot signal.

9. The optical communication system according to claim 1, wherein:

the at least one processor implemented at the receiver side of the optical communication system is configured to communicate reliably with the at least one processor implemented at the transmitter side of the optical communication system.

10. An optical communication method for transmitting an optical signal from a transmitter via an optical channel to a receiver; the method comprising:

inserting training or pilot signals at a desired pilot overhead ratio in an online operation state;

estimating and characterizing the signal recovered from the optical channel utilizing adaptive filter parameters and estimated noise characteristics in the signal;

utilizing information obtained from the estimated signal to determine channel conditions and fix the required pilot overhead ratio; and estimate a channel noise and rate of dynamic change by utilizing the received signal and its adaptive equalization parameters learnt from equalizing the received signal.

11. A non-transitory computer readable medium storing a program that causes a computer to execute an optical communication method for transmitting an optical signal from a transmitter via an optical channel to a receiver; the method comprising:

inserting training or pilot signals at a desired pilot overhead ratio in an online operation state;

estimating and characterizing the signal recovered from the optical channel utilizing adaptive filter parameters and estimated noise characteristics in the signal;

utilizing information obtained from the estimated signal to determine channel conditions and fix the required pilot overhead ratio; and estimate a channel noise and rate of dynamic change by utilizing the received signal and its adaptive equalization parameters learnt from equalizing the received signal.

* * * * *